United States Patent
Porcari

(10) Patent No.: US 6,230,613 B1
(45) Date of Patent: May 15, 2001

(54) MOULD AND MACHINE FOR THE PRODUCTION OF FILLED PASTA, IN PARTICULAR FOR RAVIOLI AND THE LIKE

(76) Inventor: Gabriele Porcari, Via Manzoni, 8 - 29010, Alseno PC (IT)

( * ) Notice: Subject to any disclaimer, the term of this patent is extended or adjusted under 35 U.S.C. 154(b) by 0 days.

(21) Appl. No.: 09/593,963

(22) Filed: Jun. 15, 2000

(30) Foreign Application Priority Data

Jun. 17, 1999 (IT) .............................. 99000011 U

(51) Int. Cl.[7] .................. A21C 9/00; A23P 1/00
(52) U.S. Cl. ............... 99/450.6; 99/450.1; 99/450.2; 99/450.7; 425/112; 425/115
(58) Field of Search ............ 99/494, 426–442, 99/485, 450.1–450.8; 425/112, 408, 115, 122, 448, 511, 512, 515, 518, 327, 237, 362, 283; 426/94, 293, 283, 275, 439, 512

(56) References Cited

U.S. PATENT DOCUMENTS

| | | | | |
|---|---|---|---|---|
| 1,844,142 | * | 2/1932 | Barili | 99/450.2 |
| 2,001,792 | * | 5/1935 | Lombi | 99/450.2 |
| 2,227,728 | * | 1/1941 | Lombi | 99/450.2 |
| 2,774,313 | * | 12/1956 | Lombi | 99/450.2 |
| 2,905,105 | * | 9/1959 | Lombi | 99/450.6 |
| 3,373,702 | * | 3/1968 | Quilici et al. | 99/450.5 |
| 3,605,641 | * | 9/1971 | Shuster | 99/450.7 |
| 3,930,441 | * | 1/1976 | Ohkawa | 425/223 X |
| 4,160,634 | * | 7/1979 | Huang | 99/450.6 |
| 4,848,218 | * | 7/1989 | Battaglia | 99/450.7 |
| 4,941,402 | * | 7/1990 | D'Alterio | 99/450.6 |
| 5,010,807 | * | 4/1991 | Anderson et al. | 99/450.6 |
| 5,205,209 | * | 4/1993 | Tansini | 99/450.6 |

* cited by examiner

*Primary Examiner*—Timothy F. Simone
(74) *Attorney, Agent, or Firm*—Young & Thompson

(57) ABSTRACT

This invention relates to a mould and the related machine for the production of filled pasta, in particular for the production of ravioli, tortellini and the like, equipped with a cutting device designed to improve the way in which the filling is enclosed between the two edges of the pasta. More specifically, the mould comprises at least one seating (2) designed to receive a first sheet of pasta with filling, and a surround (3) which surrounds the said seating; the said surround comprises a zigzag cutting edge (5) designed to press against a surface (4) which supports a second sheet of pasta to be joined to the said first sheet, and said zigzag edge (5) defines a set of wedge-shaped cavities (8) having two opposite walls (6, 7) arranged at an angle, the depth of said cavities (8) increasing, from the said edge (5) towards the inner part of the mould.

4 Claims, 3 Drawing Sheets

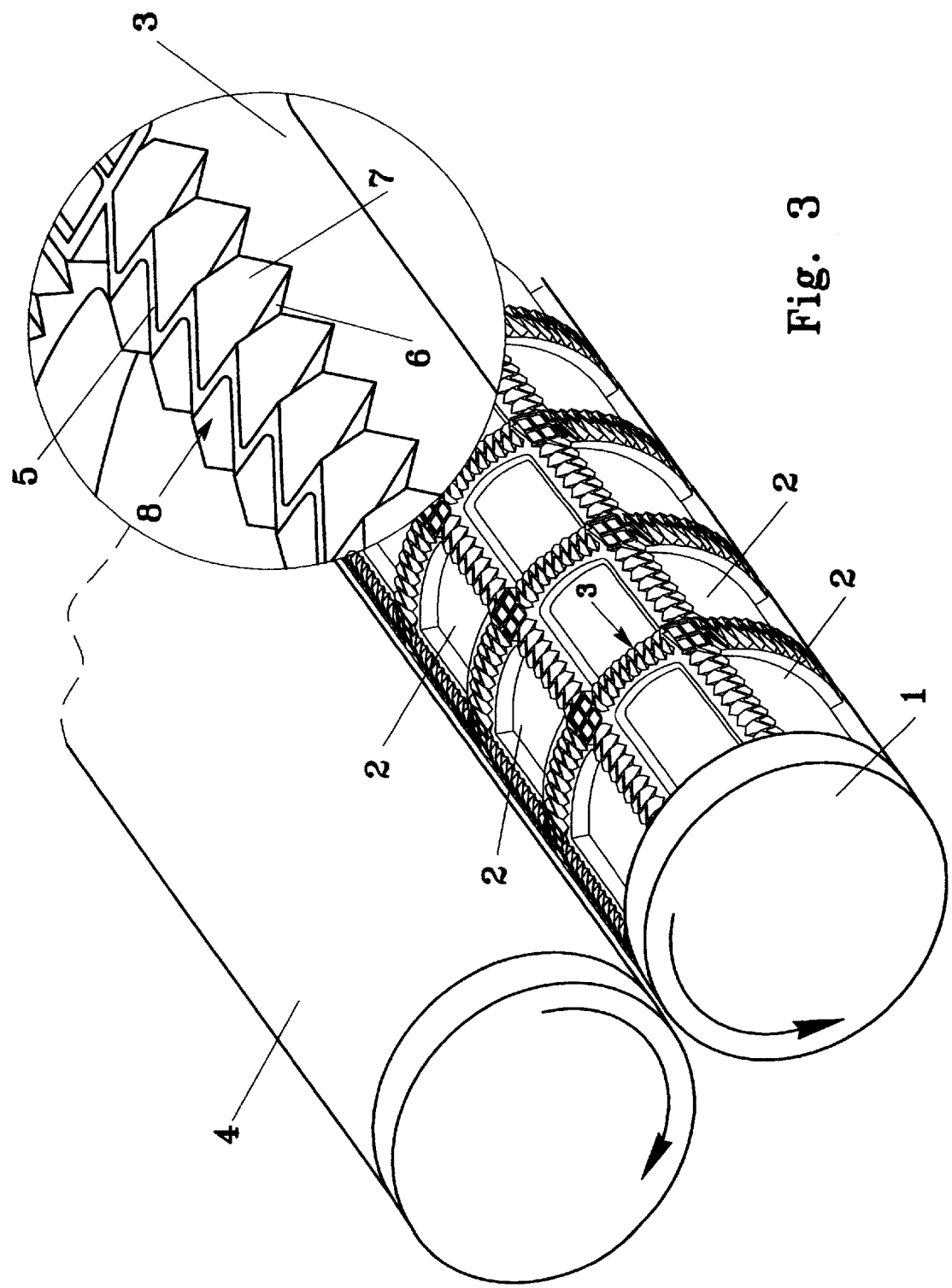

MOULD AND MACHINE FOR THE PRODUCTION OF FILLED PASTA, IN PARTICULAR FOR RAVIOLI AND THE LIKE

This invention relates to a mould and the related machine for the production of filled pasta, in particular for the production of ravioli, tortellini and the like, equipped with special cutting means designed to improve the way in which the filling is enclosed between the two edges of the pasta.

More specifically, the invention relates to a mould for ravioli-making machines characterised by the particular shape of the mould edge, which allows the two sheets of pasta containing the filling to be closed effectively, cuts the pasta and considerably improves its ability to retain the filling compared with known solutions, as it eliminates the risk that the sheets of pasta will separate, causing the filling to leak out.

With the new type of mould, the pasta edges are cut by the edge of the mould, which at the same time presses the sheets of pasta to join them and pushes the filling towards the inside simultaneously with the cutting stage.

One of the factors which has always influenced nearly all stages of filled pasta making is the difficulty of adequately joining the two sheets of pasta containing the filling.

Ravioli are usually made with ravioli-making machines, which comprise cylindrical supports fitted with moulds containing cavities into which the filling is introduced after a first sheet of pasta has been laid over them. The moulds, over which a sheet of pasta containing the filling is laid, are then pressed against a roller on which a second sheet of pasta is laid; the ravioli are formed when the two sheets of pasta are pressed together, and cut by the sharp edges of the individual moulds.

Imperfect closing of the ravioli thus obtained is considered a defect, which is not apparent at the time of purchase but only becomes apparent when the ravioli are cooked; some ravioli are partially or totally emptied of their contents when the filling escapes during cooking, to the detriment of the presentation of the product.

This defect is particularly evident in cases in which the pasta has lost its natural elasticity, namely when the product has been frozen or some time has passed since the date of manufacture.

Manufacturers have endeavoured to eliminate these disappointing results by modifying various factors, including the composition and moisture of the dough, studying the extrusion temperature or installing expensive attachments for the ravioli-making machine such as stamps which only place the filling in the centre of the mould cavity, scrapers that prevent the pasta from sticking to the roller, and complicated opening and cleaning systems.

However, these measures have not produced satisfactory results, and traditional moulds still present major drawbacks.

Figure 2:
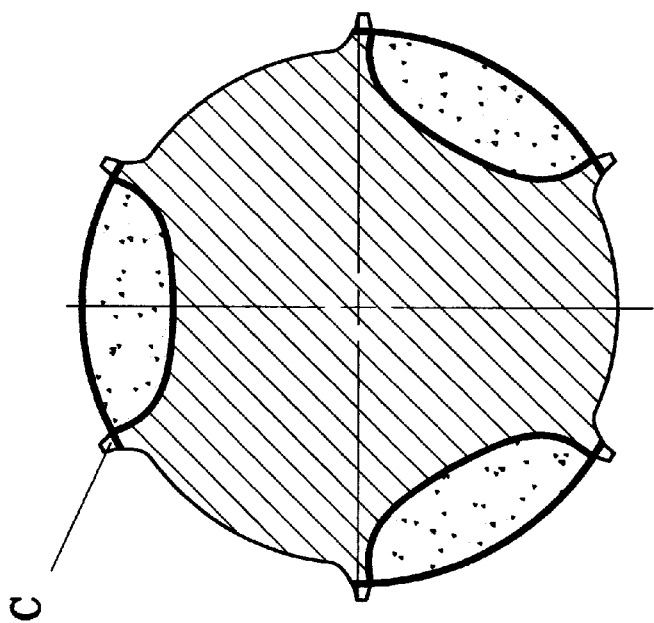
Figure 1:
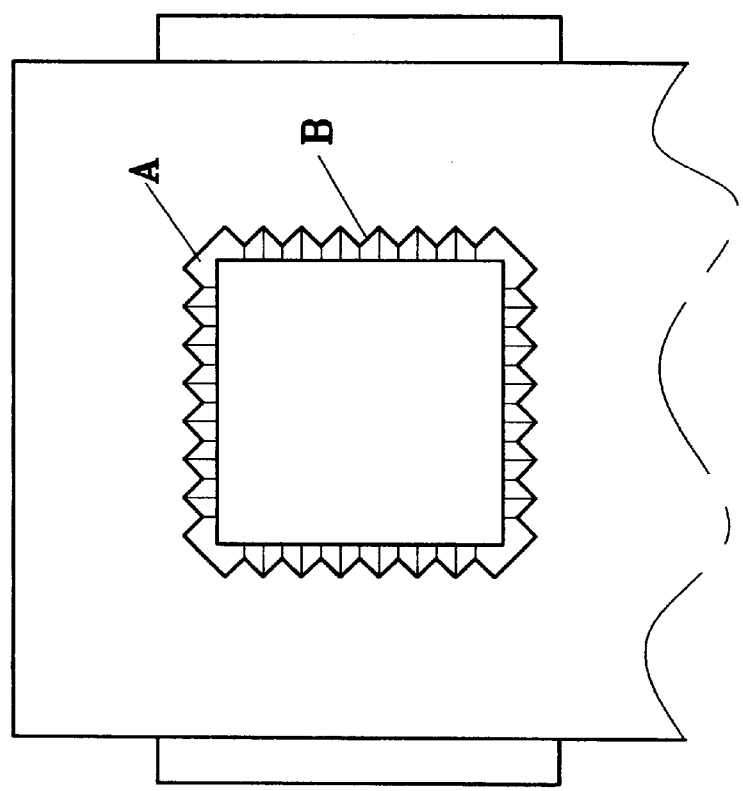

As shown in FIGS. 1 and 2, which illustrate a mould of known type seen in front view and cross-section respectively, the traditional closing system involves pressing the two sheets of pasta along edge strip A and cutting them in a zigzag shape with the sharp edges that project along perimeter B.

This system, in which the pasta is cut by raised sharp edge C in the mould surround, requires the use of a different mould for every pasta thickness employed. In addition, the pasta is weakened and loses its natural elasticity; this leads to consequent limitations on the filling possibilities and possible breakage of the ravioli, with the risk that part of the filling will come into contact with the edges and act as a lubricant that prevents them from closing.

This system also forms a wide, thick border of pasta around the ravioli, with adverse effects on their appearance and flavour.

Moreover, the pressure exerted on the edge of the ravioli may cause the sheet of pasta to stick to the forming roller, this problem can only be prevented by fitting special scraper combs designed to detach the sheet from the forming roller.

In accordance with one of the purposes of this invention, a dosing system has been devised and implemented which eliminates these drawbacks, producing satisfactory results both in functional terms and as regards product quality.

One of the advantageous aspects of the invention is that with the new mould, it is no longer necessary to have a raised edge that cuts the pasta as well as the edge that presses and joins the two sheets of pasta together, because as a result of the special conformation of the edging, the mould presses and joins the sheets of pasta and cuts them simultaneously.

With this new type of sealing, optimum filling of the ravioli is achieved and the sheets of pasta dose without being weakened.

Figure 6:
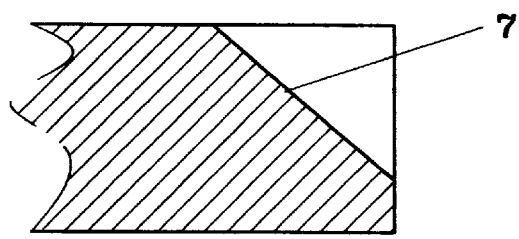
Figure 4:
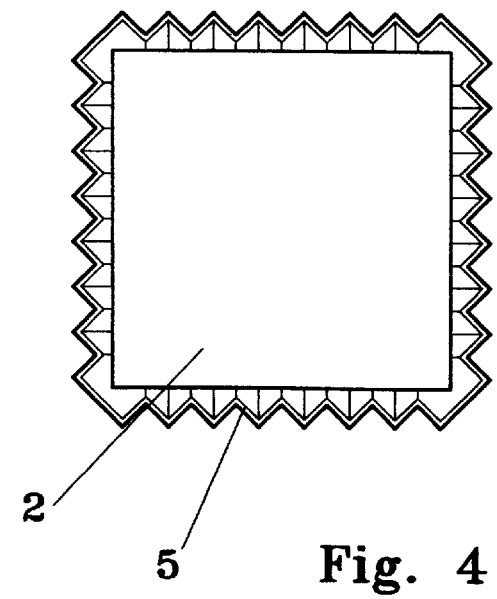
Figure 5:
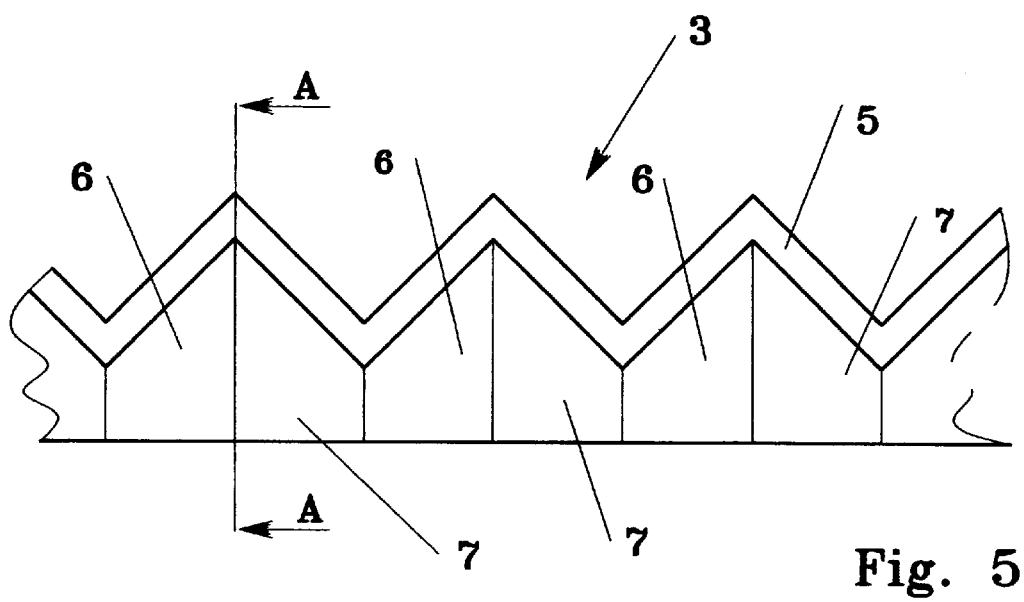

The purposes and advantages indicated above will appear more clearly from the description which follows, given by way of example but not of limitation, by reference to the annexed figures in which:

FIG. 3 schematically illustrates in perspective view a roller with a set of moulds in a ravioli-making machine in accordance with the invention FIG. 4 schematically illustrates in plan view the cavity of the closing and cutting edge in a mould in accordance with the invention FIG. 5 is a schematic plan view of the edge which joins and cuts the two sheets of pasta dough FIG. 6 schematically illustrates the cross-section of the mould edge along line A—A in FIG. 4.

By reference to FIG. 3, a mould for the production of ravioli in accordance with the invention is basically constituted by a cylinder 1 which contains a set of cavities 2, each of which corresponds to one raviolo, and each of which is edged by a raised surround indicated as 3.

The invention relates in particular to the configuration of the said surround 3.

Cylinder 1 rotates in contact with a cylinder 4, and the sheets of pasta, one on cylinder 1 filled with filling, and the other on cylinder 4, are joined and cut to make the ravioli.

Surround 3 presents (i) an edge 5 with a zigzag shape which constitutes the pasta cutting element and (ii) a set of angular pressing and cutting surfaces 6 and 7, the common lower edge of which is inclined in such a way as to define an equal number of wedge-shaped seatings 8, whose depth increases starting from edge 5.

The two sheets of pasta to be joined to form the ravioli are conveyed under pressure between surfaces 6 and 7 of each sector of the zigzag, which form a kind of wedge-shape cavity 8.

During joining of the two sheets, the two edges of the pasta are joined together in accordance with the pattern of the mould edge; the zigzag edge constitutes the cutting element, while inclined surfaces 6 and 7 of wedge-shaped seatings 8 press the pasta, pushing the filling towards the inside.

The result of this solution is that the two joined sheets of pasta are not compressed as in the case of known systems, but merely joined together with pressure which is highest close to the cutting edge and decreases towards the interior of the ravioli, thus perfectly closing the two edges of the pasta sheets in the joining area along the mould edge.

The ravioli can thus be closed without completely crushing the edge, while still preventing all possibility of leakage of the filling, even during cooking, and without weakening the pasta.

The reduction in the contact surface between the pasta and the mould also reduces the risk that the ravioli may be trapped in the mould.

This solution eliminates the need to use the attachments which were essential with earlier solutions, such as scraper combs, stamps and other opening and cleaning attachments, because with the mould in accordance with the invention, the joined pasta is cut cleanly, and the ravioli are perfectly detached from their cavities without leaving any residues.

The mould in accordance with the invention also prevents weakening of the pasta and guarantees its natural elasticity, with consequent advantages in terms of the filling and sealing of the ravioli, resulting in a finished product of excellent quality.

The pasta-to-filing ratio is also modified in that ravioli of the same size can contain a larger amount of filling.

This eliminates the limitations of the current technology, which requires the use of two coupled rollers with a double cavity for the filling to achieve the same results.

As the pasta sheets are pressed progressively, at a pressure decreasing from the cutting edge to the filling, the same mould can be used for different pasta thicknesses, whereas in the known technique, moulds must be specially made on the basis of the thickness of the pasta sheets.

The above description refers to the case of quadrangular moulds, but the same type of solution could equally well be applied to oval, rounded or polygonal moulds or moulds of any other shape.

What is claimed is:

1. Mould for the production of filled pasta, in particular ravioli, comprising at least one seating (2) designed to receive a first sheet of pasta with filling, and a surround (3) which surrounds the said seating, in which the said surround comprises a zigzag cutting edge (5) designed to press against a surface (4) which supports a second sheet of pasta to be joined to the said first sheet, which said zigzag edge (5) defines a set of wedge-shaped cavities (8) having two opposite walls (6, 7) arranged at an angle, the depth of which said cavities (8) increases from the said edge (5) towards the inner part of the mould.

2. Mould for the production of filled pasta as claimed in claim 1, comprising a pair of counter-rotating cylinders (1, 4) each of which pulls a sheet of pasta, one of which said cylinders (1) comprises a plurality of seatings (8) bounded by a zigzag surround (3), the other cylinder (4) being smooth, which said cylinders rotate in contact with one another in such a way that the said edge (5) cuts the sheets of pasta by pressing against one surface of the said cylinder (4).

3. Mould for the production of filled pasta as claimed in claim 1, characterised in that the height of the said wedge-shaped cavities (8) increases from edge (5) towards the interior of the ravioli.

4. Ravioli-making machine comprising moulds in accordance with claim 1.

* * * * *